United States Patent [19]

Onopchenko et al.

[11] 4,216,341

[45] Aug. 5, 1980

[54] SELECTIVE HYDROGENATION OF CERTAIN NITROAROMATIC HYDROXY SUBSTITUTED ACETYLENES OVER A HETEROGENEOUS RUS$_2$ CATALYST

[75] Inventors: Anatoli Onopchenko, Monroeville; Edward T. Sabourin, Allison Park; Charles M. Selwitz, Monroeville, all of Pa.

[73] Assignee: Gulf Research & Development Company, Pittsburgh, Pa.

[21] Appl. No.: 958,161

[22] Filed: Nov. 6, 1978

[51] Int. Cl.$^2$ ................... C07C 79/22; C07C 85/11; C07C 85/24
[52] U.S. Cl. ................... 568/705; 260/571; 260/575; 260/580; 260/578
[58] Field of Search .............. 568/704, 705; 260/509, 260/570, 575, 580, 571, 578, 47 UA

[56] References Cited

U.S. PATENT DOCUMENTS

| | | | |
|---|---|---|---|
| 2,402,684 | 6/1946 | Signaigo | 252/228.4 |
| 3,118,946 | 1/1964 | Grob et al. | 260/584 |
| 3,350,450 | 10/1967 | Dovell et al. | 260/577 |
| 3,845,018 | 10/1974 | Bilow et al. | 568/705 |
| 3,879,349 | 4/1977 | Billow et al. | 260/47 UA |
| 3,907,968 | 9/1975 | Kobylinski et al. | 423/213.5 |
| 4,051,177 | 9/1977 | Braden et al. | 260/510 |

FOREIGN PATENT DOCUMENTS 1431640   4/1976   United Kingdom ................... 568/705

OTHER PUBLICATIONS

Burawoy et al., "Tetrahedron", (1959), vol. 5, pp. 340-351.
Friefelder, "Practical Catalytic Hydrogenation", p. 168 (1971), Wiley.
Hennion, "J. Amer. Chem. Soc.", vol. 79 pp. 2146-2148.
Huntress, "J. Amer. Chem. Soc.", vol. 56, p. 241, (1934).
Organic Syntheses, Coll. vol. 3, pp. 69-70.
Woodburn et al., "J. Amer. Chem. Soc.", vol. 72, p. 1361.
Chem. Abs., vol. 79 (1973), p. 77771r: Chem. Abs., vol. 81 (1974), p. 151684z.

*Primary Examiner*—Werren B. Lone

[57] ABSTRACT

Nitroaromatic hydroxy substituted acetylene compounds wherein both the nitro and acetylene groups are directly connected to aromatic ring carbon atoms are hydrogenated in an inert solvent to selectively reduce the nitro function over a ruthenium disulfide catalyst. Of particular interest is the preparation of aminophenylacetylene from nitrophenyl hydroxy substituted acetylene.

25 Claims, No Drawings

SELECTIVE HYDROGENATION OF CERTAIN NITROAROMATIC HYDROXY SUBSTITUTED ACETYLENES OVER A HETEROGENEOUS RUS₂ CATALYST

This invention relates to a process for the selective hydrogenation of nitro groups on a nitroaromatic hydroxy substituted acetylene compound and in particular to the preparation of aminophenylacetylene from 2-methyl-4-(3-nitrophenyl)-3-butyn-2-ol over a ruthenium disulfide catalyst.

BACKGROUND OF THE INVENTION

The recent introduction of acetylene-terminated polyimides to produce cured reaction products which are stable at very high temperatures of 450° C. and up has created an interest and need to produce the polyimides at attractive and competitive costs. The prime difficulty in the preparation of the acetylene-terminated polyimides which are described, for example, in U.S. Pat. No. 3,845,018 and U.S. Pat. No. 3,879,349, both to Norman Bilow et al, is the preparation of the monomers which include in one instance the preparation of meta-aminophenylacetylene (APA). This invention relates to the discovery of a supported or unsupported ruthenium disulfide catalyst which selectivity converts at high conversion levels the nitroaromatic hydroxy substituted acetylene compounds used in the process of this invention, e.g., 2-methyl-4-(3-nitrophenyl)-3-butyn-2-ol to the desired APA or substituted APA.

DESCRIPTION OF THE PRIOR ART

The description of the preparation of APA contained in the teachings of Bilow et al in U.S. Pat. No. 3,845,018 involves a large number of expensive and time-consuming steps. Thus Bilow et al in Column 4, lines 41 et seq., teach that an aromatic compound having both nitro and acetylene substituents is reacted, preferably under reflux, with dimethylformamide and phosphorus oxychloride to convert the acetyl radical to —C(Cl)═CHCHO. The reaction is exothermic, and external cooling is needed to keep it at approximately room temperature. The β-chloro-substituted aldehyde radical is converted to —C≡CH by refluxing a solution of the compound in p-dioxane and sodium hydroxide. The product is extracted with an organic solvent such as diethylether; the organic solution is dried; the solvent is removed; and the product recovered by vacuum distillation.

Improved techniques over those taught by Bilow et al obviously have to be developed in order to improve the competitive position of the resultant acetylene-terminated polyimides in the marketplace.

One desirable technique to prepare aminophenylacetylene is to first prepare nitrophenylacetylene and then selectively hydrogenate the nitro group. This is a considerably difficult problem, since both the nitro and acetylene groups directly connected to an aromatic ring carbon atom are two of the most reactive groups known for hydrogenation. Undoubtedly the difficulty of selectively hydrogenating a nitro group in the conjoint presence of an acetylene moiety directly attached to an aromatic ring carbon atom accounts for the literature referring to the use of chemical reducing agents for the reduction of nitro groups. For example, the literature refers to the use of zinc in ammonium hydroxide (A. Burawoy and J. T. Critchley, *Tetrahedron*, No. 5, 340 (1959)); sodium hydrosulfite (see *Organic Syntheses*, Coll. Vol. III, John Wiley & Sons, Inc., New York, N.Y. 1966 p. 69); ammonium sulfite (E. H. Huntress, L. N. Stanley and A. S. Parker, *J. Am. Chem. Soc.*, 56, 241 (1934); ferrous sulfate (U.S. Pat. No. 3,845,018 (1974); stannous chloride (H. M. Woodburn and C. F. Stuntz, *J. Am. Chem. Soc.*, 72, 1361 (1950); and thiourea dioxide (K. Nakagawa and K. Minami, *Tetrahedron Lett.*, No. 5, 343 (1972)) for the chemical reduction of nitro groups. The procedures, however, in the referred-to-literature are generally tedious and unattractive for commercial application. Catalytic hydrogenation with molecular hydrogen is preferably for reasons of economy, safety and flexibility. No satisfactory catalytic method for the selective hydrogenation of aromatic nitro compounds in the conjoint presence of an acetylenic moiety where the acetylenic carbon is directly connected to an aromatic ring carbon atom has been reported as yet. Sokol'skii et al, however, studied competitive hydrogenation of phenylacetylene and nitrobenzene over nickel and platinum on alumina and found the addition of hydrogen to acetylene to be non-selective (K. K. Kuzenbaez, K. A. Zhubanov, and B. V Sokol'skii, *Dokl. Vses. Konf. Khim. Atsetilena*, 4th, 1972, 3 325; *Chem. Abs.*, 79,77771r (1973)). Reduction of phenylacetylene over palladium on alumina occurs two or three times faster in the presence of nitrobenzene than in its absence. (K. A. Zhubanov, B. V. Sokol'skii, E. P. Mazin, et al, *Zh. Prikl. Khim.*, 47, (8) 1885 (1974); *Chem. Abs.*, 81 151684z (1974)). Hennion and Barrett hydrogenated propargyl esters of p-nitrobenzoic acid over palladium on barium sulfate and converted the ethynyl group to vinyl without affecting the nitro functionality (G. F. Hennion and S. O. Barrett, *J. Am. Chem. Soc.*, 79,2146 (1957). Grob and Jenny in U.S. Pat. No. 3,118,946, hydrogenated 2-nitrooctadec-4-yn-1,3-diol over Lindlar catalyst and obtained 2-nitrooctadec-4-en-1,3-diol selectivity. It is obvious that the selective hydrogenation of a nitro group in the conjoint presence of the highly reactive acetylenic function where both are directly connected to aromatic ring carbon atoms on the same molecule presents a formidable problem. It is apparent that a wide spectrum of products could be expected since the nitro function, the aromatic ring and the acetylene function can all be partially or completely hydrogenated.

British Pat. No. 1,431,640 is mainly concerned with the catalytic hydrogenation of 4,4'-dinitrostilbene-2,2'disulfonic acid to the corresponding 4,4'-diamino-2,2'disulfonic acid, as half of their working examples are with this substrate (Exs. 4–6 and 15–23). The British patent does have general teachings to the effect that aromatic nitro compounds wherein the nitro group is aromatically bonded and which contain aliphatic C—C multiple bonds can be selectively catalytically reduced so that the nitro group is converted to the amino group without substantial loss of the C—C multiple bonds. All of the working examples, save one, are concerned with the selective reduction of aromatically bonded nitro groups in the presence of carbon to carbon double bonds. The one exception is the selective hydrogenation of 2-acetylamino-4-nitrobenzoic acid propargyl ester (Ex. 12) to produce the corresponding aminobenzoic acid propargyl ester. The propargyl ester function, of course, contains an acetylenic group, but it is noted that this acetylenic group is not directly bonded to an aromatic carbon atom and thus is not "activated" by the ring.

Thus the British patent does not have a working example utilizing a charge stock which contains both a nitro group and an acetylenic group directly attached to aromatic ring carbon atoms. Furthermore, the list of suitable examples of aromatic nitro compounds contained on page 3 of the British patent cites no aromatic compound wherein both the nitro and acetylenic linkages are directly connected to aromatic carbon atoms. The British teachings to effect the above described selective reduction involve hydrogenation in the presence of a metal sulfide of the formula $MS_x$, wherein x is a number from 1 to 4, and M represents a metal atom of Group VIII of the Periodic System of the elements, or represents rhenium. According to the British patent, the reaction can occur at temperatures from 20° to 140° C. and at pressures of 5 to 150 bars of hydrogen pressure. The catalysts may be utilized unsupported (p. 2, Col. 2), or the metal sulfides may be deposited on a support wherein the active metal sulfide on the support can be between 0.1 to 5 percent by weight (p. 3, Col. 1). The patent also teaches that the catalytically active component can be employed in amounts of 0.005 to 10 percent, especially 0.05 to 5 percent relative to the nitro compounds (p. 3, Col. 1, lines 8-11). The working examples use many different types of metal sulfide catalysts, including iron, cobalt, nickel, rhenium, platinum and ruthenium, both supported and unsupported. (The more recently issued U.S. Pat. No. 4,051,177, dated Sept. 27, 1977, is based on part of the specification of the British patent but is limited in its teachings to the use of a cobalt sulfide catalyst).

Morris Freifelder in "Practical Catalytic Hydrogenation", Wiley-Interscience Publishers, New York, N.Y. (1971) on page 168 states that the nitro group attached to a benzene ring, with the exception of the acetylenic linkage, is the most amenable of all reducible systems to catalytic hydrogenation. According to the author, not enough work has been carried out on the reducibility of the triple bonds in the aromatic nitro group to state authoritatively that one will be selectively hydrogenated in the presence of the other. In most other instances, an aromatically bound nitro group will be preferentially reduced in the presence of another reducible function. On page 192 of the same reference, the author concludes that the nitro group is generally preferentially reduced in the presence of olefinic bonds.

A fair summary of the above teachings of the prior art would appear to suggest that the aromatic nitro group wherein the nitro group is directly attached to an aromatic carbon atom is a highly reducible group and that it will selectively hydrogenate in the presence of olefinic double bonds, and that such a nitro group will also selectively reduce in the presence of aliphatic carbon to carbon triple bonds which are present on a chain wherein the triple bond is not directly connected to an aromatic carbon atom. Freifelder suggests that the selectivity to the reduction of the nitro group in the conjoint presence of carbon to carbon triple bonds, both directly connected to the same aromatic nucleus, is not settled, and the recent British patent would appear to suggest a wide variety of metal sulfides to selectively reduce aromatic nitro groups on certain types of compounds containing, in addition C—C multiple bonds.

It has now been found in accordance with the invention that nitro aromatic compounds containing at least one nitro group directly connected to an aromatic ring carbon atom, and at least one acetylene group having at least three carbon atoms and a hydroxyl group on the carbon atom adjacent the acetylene group and wherein the acetylene moiety is directly connected to an aromatic ring carbon through an acetylene carbon, can be selectively reduced using free molecular hydrogen to the corresponding amino aromatic still containing the hydroxy substituted acetylene moiety by contacting the nitro aromatic compound in the liquid phase with a solid catalyst consisting essentially of ruthenium disulfide with free molecular hydrogen under hydrogenation conditions including a temperature of 20° C. to 120° C. Preferably the reaction is run in the presence of an inert solvent.

DEFINITION OF CHARGE STOCK

The charge stock for the process of this invention is a nitro aromatic compound containing (i) at least one nitro group directly connected to an aromatic ring carbon atom and (ii) at least one acetylene group directly connected to an aromatic ring carbon atom through one of the acetylene group carbon atoms and which acetylene group has at least three carbon atoms and a hydroxyl group on the carbon atom adjacent to the acetylene group. More preferably, the nitro aromatic compound charge stock has (i) from one to two nitro groups, (ii) from one to two substituted acrtylene moieties directly attached through an acetylene carbon atom to aromatic ring carbon atoms, and (iii) from one to two aromatic rings. The aromatic nucleus can be derived from benzene, naphthalene, bibenzyl, diphenyl, diphenyl oxide, diphenyl sulfide, or benzophenone, with the nitro and the acetylene groups being attached to the same or different aromatic rings. The nitro aromatic compound usually has from 9 to 30 carbon atoms and more usually has from 9 to 16 carbon atoms.

Most preferably the nitro aromatic compound charge stock utilized in the process of this invention has the formula:

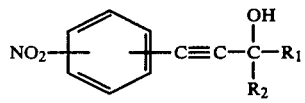

where $R_1$ and $R_2$ can be the same or different and are selected from the group consisting of hydrogen and lower alkyl groups having from 1 to 4 carbon atoms, phenyl, and substituted phenyl, and where $R_1$ and $R_2$ can form a saturated 5- or 6-membered ring.

Suitable specific examples of charge stocks which fall within the scope of this invention include but are not limited to the following materials:
4-(3-nitrophenyl)-3-butyn-2-ol;
4-(2-nitrophenyl)-3-butyn-2-ol;
4-(4-nitrophenyl)-3-butyn-2-ol;
2-methyl-4-(3-nitrophenyl)-3-butyn-2-ol;
2-methyl-4-(2-nitrophenyl)-3-butyn-2-ol;
2-methyl-(4-nitrophenyl)-3-butyn-2-ol;
2-phenyl-4-(3-nitrophenyl)-3-butyn-2-ol;
2-phenyl-4-(2-nitrophenyl)-3-butyn-2-ol;
2phenyl-4-(4-nitrophenyl)-3-butyn-2-ol;
3-(3-nitrophenyl)-2-propyn-1-ol;
3-(2-nitrophenyl)-2-propyn-1-ol;
3-(4-nitrophenyl)-2-propyn-1-ol;
3-methyl-5-(3-nitrophenyl)-4-pentyn-3-ol;
3-methyl-5-(3-nitrophenyl)-4-pentyn-3-ol;
3-methyl-5-(2-nitrophenyl)-4-pentyn-3-ol;
3-methyl-5-(4-nitrophenyl)-4-pentyn-3-ol;
1-(3-nitrophenylethynyl)cyclohexanol;
1-(2-nitrophenylethynyl)cyclohexanol;

1-(4-nitrophenylethynyl)cyclohexanol;
1-(3-nitrophenylethynyl)cyclopentanol;
1-(2-nitrophenylethynyl)cyclopentanol;
1-(4-nitrophenylethynyl)cyclopentanol;
2-methyl-4-(2,4-dinitrophenyl)-3-butyn-2-ol;
2-methyl-4-(8-nitro-1-naphthyl)-3-butyn-2-ol;
2-methyl-4-(3-nitro-2-naphthyl)-3-butyn-2-ol;
1,4-bis(2-methyl-3-butyn-2-ol-4-yl)nitrobenzene;
9-nitro-2-[(prop-2-yn-1-ol-3-yl)]biphenyl;
2-nitro-4-(prop-2-yn-1-ol-3-yl)biphenyl;
3-nitro-3'-(prop-2-yn-1-ol-3-yl)diphenyl ether;
4-nitro-4'-(prop-2-yn-1-ol-3-yl)diphenyl ether;
3-nitro-3'-(prop-2-yn-1-ol-3-yl)diphenyl sulfide;
3-nitro-3'-(prop-2-yn-1-ol-3-yl)benzophenone.

The nitro aromatic compound charge stocks described above can be prepared by any suitable procedure, and the method of preparation of these materials forms no part of the present invention. For example, the nitro-aromatic hydroxy substituted acetylenes can be prepared by reacting nitrophenylacetylene with a ketone in the presence of an alkali metal hydroxide, e.g.

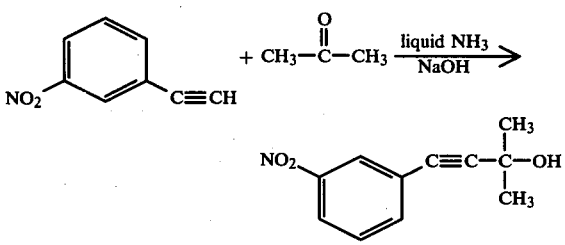

The nitro aromatic charge stocks described above are selectively hydrogenated to produce the corresponding substituted amino aromatic acetylenes, and a list of specific examples would parallel the list of nitro aromatic compounds set forth above except "amino" would replace "nitro" in each compound.

In particular, this invention is concerned with the preparation of substituted amino aromatic acetylenes having the formula:

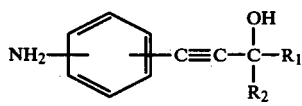

where $R_1$ and $R_2$ can be the same or different and are selected from the group consisting of hydrogen and lower alkyl groups having from 1 to 4 carbon atoms, phenyl, and substituted phenyl, and where $R_1$ and $R_2$ can form a saturated 5- or 6-membered ring.

Preferred among these amino aromatics are those wherein $R_1$ and $R_2$ are methyl; and most preferred is where the amino group is meta to the acetylene moiety.

Specific exmaples of amino aromatic substituted acetylenes include:
4-(3-aminophenyl)-3-butyn-2-ol;
2-methyl-4-(3-aminophenyl)-3-butyn-2-ol;
2-methyl-4-(2-aminophenyl)-3-butyn-2-ol;
2-methyl-4-(4-aminophenyl)-3-butyn-2-ol;
2-phenyl-4-(3-aminophenyl)-3-butyn-2-ol;
3-(4-aminophenyl)-2-propyn-1-ol;
3-methyl-2-(2-aminophenyl)-4-pentyn-3-ol;
1-(3-aminophenylethynyl)cyclohexanol; and
1-(3-aminophenylethynyl)cyclopentanol.

The amino-aromatic hydroxy substituted acetylenes prepared by the method of this invention, i.e. those wherein a hydroxyl group is present on the carbon atom adjacent the acetylene group, are intermediates in the preparation of aminophenylacetylene by simple cleavage in the presence of a catalytic amount of base, as shown below, e.g.:

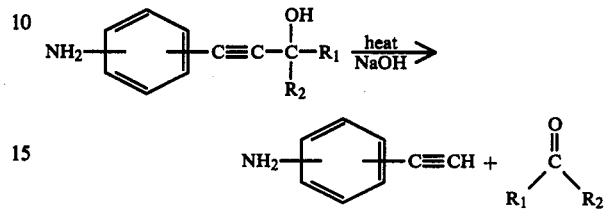

where $R_1$ and $R_2$ are as defined above.

Any alkali metal hydroxide can be utilized to perform the cleavage operation shown above, as such alkali metal hydroxides include: sodium hydroxide, potassium hydroxide and lithium hydroxide.

The amino-aromatic hydroxy substituted acetylenes are prepared from the corresponding nitro-aromatic hydroxy substituted acetylenes by the selective hydrogenation of the nitro group using free molecular hydrogen in the contact presence of an unsupported or supported catalyst consisting essentially of ruthenium disulfide.

DESCRIPTION OF THE CATALYST

The catalyst which has been found necessary for effecting the selective reduction reaction of this invention is ruthenium disulfide either unsupported or on a support.

Ruthenium disulfide catalysts, supported and unsupported, are known. The method of preparation of the ruthenium disulfide catalyst is therefore not critical.

For example, a ruthenium disulfide from the reaction of ruthenium salts and hydrogen sulfide, or from the reaction of ruthenium and sulfur elements can be used. Some of the typical methods of catalyst preparation have been referred to in U.S. Pat. No. 3,350,450 and references cited therein. As another example, see E. de Barry Barnet and C. L. Wilson's "Inorganic Chemistry", Longmar's Green & Co., London, England, 1953, p. 244, wherein a ruthenium salt or a ruthenate salt or treatment with aqueous sodium sulfide will give $RuS_2$.

As will be shown below, the active form of the ruthenium catalyst is $RuS_2$ where the Ru is in the +4 valence state. The $RuS_2$ is converted during reaction to the RuS form where the Ru is in the +2 valence and reaction ceases. The conversion of RuS to Ru in the zero valent form was never observed under the mild reaction conditions of this invention. Thus the catalyst of this invention must contain at least some $RuS_2$ (ruthenium disulfide) in order to be active for promoting the selective hydrogenation reactions of this invention. Any means can suitably be employed to monitor the ruthenium in the $RuS_2$ state as reaction proceeds. One such means would include the continuous or periodic addition of some sulfur containing species such as sulfur, hydrogen sulfide or sodium sulfide to the reaction zone.

In a preferred embodiment of the process, the ruthenium disulfide is produced by reacting a ruthenium salt such as ruthenium trichloride hydrate and an alkali or alkaline earth metal sulfide. Other suitable ruthenium salts which can be used include ruthenium nitrate, potassium ruthenate, sodium ruthenate, and ruthenium sulfate and etc.

The weight ratio of the nitroaromatic acetylene to the ruthenium disulfide catalyst is not critical, but for maxium productivity and efficiency, one wishes to hydrogenate as much feed as possible per given amount of catalyst. Suitably the weight ratio of the nitroaromatic acetylene to ruthenium as the metal is from 10:1 to 300:1 or higher, and usually the weight ratio is from 15:1 to 150:1.

The ruthenium disulfide can also be employed distended or dispersed substantially uniformly over a catalyst support by techniques which are well known to those having ordinary skill in the art. For example, the ruthenium can be deposited from a ruthenium salt solution, usually aqueous, and also containing sodium sulfide onto the support, which is then dried. Suitable ruthenium salts include, without limitation: barium perruthenate, sodium perruthenate, and the like; ruthenates such as magnesium, strontium, calcium, silver, barium and sodium ruthenates; perruthenates such as sodium and potassium perruthenates and the like; ruthenium halides such as ruthenium dichloride, ruthenium trichloride, rithenium tetrachloride, ruthenium pentafluoride, and the like; and chloro salts of ruthenium such as potassium ruthenate and to physically admix the barium ruthenate by ball-milling with a support such as gamma-alumina, followed by a treatment of the final product with hydrogen sulfide to produce an activated ruthenium catalyst. The first part of this technique is described, for example, in U.S. Pat. No. 3,907,968 to Kobylinski et al, issued Sept. 23, 1975.

The catalyst supports which can be employed are any of those which are well-known, non-catalytic-cracking type supports such as those which are used for hydrogenation type reactions in the petroleum industry. Specific examples of suitable catalyst supports include: carbon, alumina (including activated alumina), silica (including kieselguhr), and synthetic gels, titanium dioxide, calcium carbonate, barium sulfate, bentonite, and the like. The preferred supported catalysts have a ruthenium metal content from 0.01 weight percent to about 10 percent by weight of the final catalyst, perferably from 0.4 to 7 weight percent of the catalyst calculated as ruthenium, and most preferably from 0.5 to 5 weight percent.

The selective hydrogenation reaction of this invention can be run neat by contacting the charge stock in the liquid phase along with free molecular hydrogen with a ruthenium disulfide catalyst under relatively mild reaction conditions including a temperature from about 20° C. to 120° C. The charge stocks are, however, highly reactive as they contain both nitro and acetylene functions; and for safety reasons, it is perferred to operate the reaction in the presence of an inert solvent, which functions primarily as a heat control medium. By better heat control, side reactions such as polymerization, condensation and hydrolysis are inhibited.

The type and amount of solvent used are not critical but it is preferred to employ a solvent which is miscible with the water of reaction so that separate phases are not formed during the selective reduction reaction. This is especially important in batch operations using powdered catalysts which tend to clump in the presence of free water and thus prematurely stop the reaction. From the above it is obvious that the amount of solvent to employ is that preferably sufficient to maintain a single liquid phase reaction system. Obviously the solvent must be miscible with the charge stock and must also resist reaction with hydrogen under the mild conditions of this invention. Usually the solvent-to-charge stock weight ratio is from 1:1 to 200:1, and more usually is from 4:1 to 20:1.

Examples of suitable solvents include but are not meant to be limited to: aliphatic alcohols having from 1 to 5 carbon atoms, such as methanol, ethanol, propanol, isopropanol and pentanol; organic esters having from 3 to 6 carbon atoms, such as ethyl acetate, methyl acetate; low molecular weight ethers, such as diethyl ether, methylpropyl ether, tetrahydrofuran and p-dioxane; low molecular weight organic acids having from 2 to 5 carbon atoms, such as acetic acid, propionic acid; and toluene.

The selective reduction reactions of this invention can be operated using, for example, a batch or continuous process. In a batch process, the catalyst can be in any suitable form, but is usually in the form of a powder or a paste. The weight ratio of the nitroaromatic acetylene to the catalyst in the batch process is as defined above. In a continuous process, catalyst can be added separately or in admixture with the charge stock continuously to one end of a stirred reactor while product and catalyst are continuously removed from the other end or points in between. The free molecular hydrogen necessary for the reduction reaction can be passed concurrently with the charge stock or can enter the reaction zone countercurrent to the charge stock. The hydrogen can be pure 100% hydrogen, but it is possible to use refinery hydrogen wherein the hydrogen content is between 70 and 95 volume percent.

The reaction conditions are mild and include a temperature from 20° to 120° C., preferably 25° to 80° C. The reaction rate below 20° C. is too low to be of commercial significance, while temperatures above about 120° C. tend to promote undesired side reactions such as polymerization and hydrogenation of the acetylene groups and the addition of sulfur species to the triple bond.

The reaction pressure is not critical, and suitable reaction pressures include atmospheric to 150 atmospheres, perferably 2 atmospheres at 100 atmospheres. The reaction is operated, of course, in the presence of free molecular hydrogen, which at atmospheric pressure can be bubbled through the reaction mixture. The reaction is preferably operated at elevated hydrogen partial pressures of from 2 to 100 atmospheres (0.20 to 10.1 MPa). The reaction time is likewise not critical and is a function of many variables including the type of charge stock and the reaction conditions. Usually the reaction times are from 10 minutes to 100 hours; more usually the reaction time is from 30 minutes to 10 hours.

It has been found that the nitro group on the nitroaromatic hydroxyl substituted acetylene charge stocks of this invention is selectively reduced at high conversion levels to give unexpectedly high yields of the desired substituted amino aromatic acetylenes. The process of this invention can be operated within the range of conditions set forth above to provide weight percent conversions of the nitro aromatic compound charge stocks from 70 to 100 percent, although, obviously, lower conversions can occur. The selectivities to the production of the desired corresponding amino aromatics still containing the acetylene group are usually over 70 percent and can be from 90 to 100 percent, even at the higher conversion levels.

The product recovery is not difficult and can suitably be achieved by simple vacuum or steam distillation or by fractional crystallization to separate the product from unreacted charge stock. Obviously care must be taken in the distillation of the products (or other recovery technique) from the realization that the products contain an acetylene function.

It has been found the catalyst when deactivated can be reactivated by any suitable means to insure the ruthenium is in the $RuS_2$ form. For example, spent catalyst (RuS) can be treated with an aqueous solution of sodium sulfide nonahydrate to prepare the $RuS_2$ or the RuS can be treated with other sulfur species e.g. $H_2S$ under appropriate and known conditions to prepare $RuS_2$.

The invention will be further described with reference to the following experimental work.

EXPERIMENTAL WORK

In all of the working Examples, the substituted nitro aromatic acetylene charge stock was 2-methyl-4-(3-nitrophenyl)-3-butyn-2-ol.

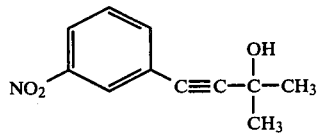

Unless otherwise noted, a batch-type reaction was employed, as follows:

(1) The 2-methyl-4-(3-nitrophenyl)-3-butyn-2-ol dissolved in isopropanol which was used as the solvent.

(2) The catalyst was added, and the mixture placed into a standard 500-ml Parr hydrogenation bottle.

(3) The system was purged with hydrogen.

(4) The desired operating temperature was adjusted, and the bottle pressured with free molecular hydrogen to 60 psig (414 kPa) and maintained in the stipulated pressure range by periodic injection of measured amounts of additional hydrogen.

(5) The reaction was allowed to proceed until the theoretical amount of hydrogen was consumed to convert the $-NO_2$ groups in the charge stock to $-NH_2$ and water. (The hydrogen consumed was measured either by pressure drop or by gas-liquid chromatography of aliquots.)

(6) After the reaction was deemed complete, the reaction mixture was allowed to cool to room temperature and the mixture was then filtered through a glass frit to remove the catalyst.

(7) The liquid product was then stripped of solvent on a rotary evaporator to give a tan solid which was then subject to gas chromatographic analysis and showed mostly the presence of 2-methyl-4-(3-aminophenyl)-3-butyn-2-ol.

(8) The crude solid product was recrystallized from toluene to yield cream-colored needles having a melting point of 117° to 118° C. The cream-colored needles were shown to have a molecular weight of 175 by mass spectroscopy. The fragmentation pattern showed strong ions at (M-18)+ indicating loss of water and at (M-58)+ indicating loss of acetone from the parent ion. The nuclear magnetic resonance spectrum ($CDCl_3$) was delta 7.2–6.6 (m, 4H), 4.6–3.8 (broad resonance, 3H, exchanges with $D_2O$), 1.56 (S, 6H).

The elemental analysis of the cream-colored needles was as folows: C, 75.63; H, 7.38; N, 7.48. (Theoretical is C, 75.40; H, 7.48; and N, 7.99.)

From the above it was determined that the product has the molecular formula: $C_{11}H_{13}NO$.

In all of the working Examples in this specification, the term "conversion" shall mean weight percent of 2-methyl-4-(3-nitrophenyl)-3-butyn-2-ol converted to all products; and "selectivity" shall mean the weight of 2-methyl-4-(3-aminophenyl)-3-butyn-2-ol isolated from the reaction product divided by the weight of 2-methyl-4-(3-aminophenyl)-3-butyn-2-ol theoretically expected.

The invention will be further described with reference to the following experimental work.

EXAMPLE 1

A total of 4.75 g of $RuCL_3.xH_2O$ (Engelhard Co.) were dissolved in 50 mls of distilled water, blanketed by nitrogen to prevent oxidation, and heated to 65° C. A solution of 10 g of sodium sulfide nonahydrate in 75 mls of water was added, while stirring, to the first solution over 15 min. Reaction was continued for 60 minutes at 50°–60° C. The catalyst paste was collected by suction filtering and washed two times with 100 ml portions of boiling water. A total of 7.8 g of black, paste-like, wet $RuS_2$ was obtained. Analysis of the catalyst by X-ray photoelectron spectroscopy (XPS), or ESCA, indicated ruthenium to be in the +4 valency state corresponding to $RuS_2$ structure. None of the ruthenium in the +2 or zero valency state was found.

EXAMPLE 2

A total of 22 grams of 2-methyl-4-(3-nitrophenyl)-3-butyn-2-ol in isopropanol (15.6 wt % concentration) was hydrogenated in the presence of 0.60 g of ruthenium sulfide catalyst of Example 1 until no further absorption of hydrogen was evident. Reaction was carried out at 63° C. and 54 to 65 psig (0.37 to 0.45 MPa) of hydrogen pressure. After a total of about 9.6 hours, hydrogen uptake stopped, although the reaction was held under conditions for a period of 22 hours. Analysis of product showed that 16.4% of feed was converted to the desired amine (2-methyl-4-(3-aminophenyl)-3-butyn-2-ol before reaction stopped. Selectivity to amine was essentially quantiative. Results showed that a total of 31.6 grams of feed were converted per gram of catalyst (as Ru metal), before catalyst became inactive. The spent catalyst of ESCA was shown to be RuS.

EXAMPLE 3

The reaction mixture of Example 2 was filtered to recover the catalyst, and the catalyst was treated with 5.6 grams of sodium sulfide nonahydrate dissolved in 75 milliliters of water by stirring at 70°–75° C. for 15 minutes, and filtering. After washing two times with 50 milliliters of boiling water each time, the catalyst was returned to the alcohol solution of Example 2.

EXAMPLE 4

The recovered catalyst, after regeneration with sodium sulfide solution was returned to the reactor and hydrogenation of Example 2 product was continued arbitrarily at 65° C. and 58–65 psig (0.39–0.45 MPa) of hydrogen pressure for four additional hours. Analysis by chromatography showed that conversion of feed had increased to 22% with selectivity to amine again being essentially 100%. This example shows that deactivated or spent catalyst was fully restored to the active form by simple heating in the presence of the sulfide solution.

The product of Example 4 was filtered to recover the catalyst, and the filtrate was evaporated to dryness in a rotary evaporator to give 21.1 g. of product. The product was recrystallized from 50 milliliters of toluene to afford 3.65 grams of 2-methyl-4-(3-aminophenyl)-3-butyn-2-ol, melting point 118–119° C. The nmr spectrum of product was identical in all aspects to the authentic sample.

EXAMPLE 5

A total of 1.76 grams of 2-methyl-4-(3-nitrophenyl)-3-butyn-2-ol in 150 milliliters of isopropanol was hydrogenated in a Parr shaker over 2.0 grams of wet ruthenium disulfide at 70° C., 50–60 psig of hydrogen, for 83 minutes, until no further hydrogen uptake was evident. The ratio of feed to ruthenium as metal, on gram/gram basis, was 6.5/1. After filtration to recover the catalyst, and evaporation of filtrate to dryness in a rotary evaporator, the residue was crystallized from toluene (100 milliliters) to afford 1.48 grams of offwhite product, melting between 115° and 118° C. Nuclear magnetic resonance spectrum was consistent with the product being 2-methyl-4-(3-aminophenyl)-3-butyn-2-ol. This run shows that using a 1.5 Wt. % concentration of substrate resulted in essentially quantitative yield (98.6%) of the corresponding amine.

EXAMPLE 6

One batch of ruthenium polysulfide catalyst on charcoal support was prepared to correspond to 5% as Ruthenium metal. In a typical experiment, 15 parts of sodium sulfide nonahydrate were dissolved in 85 parts of water, heated to 90° C., and one part of sulfur was then added. Reaction was continued while stirring at this temperature until sulfur has dissolved, and then commercial charcoal, high surface area, powder (Pittsburgh Carbon Co.) was added in an amount sufficient, that whenever ruthenium chloride is added, desired ruthenium metal concentrations will be obtained. After addition of ruthenium chloride, the entire mixture was reacted at 70°–80° C., while stirring, for about 30 minutes. After filtration, the solid catalyst was rotoevaporated at 120° C. for 2 hours, and then stored under nitrogen.

EXAMPLE 7

In this experiment, 2.1 grams of 2-methyl-4-(3-nitrophenyl)-3-butyn-2-ol was hydrogenated in 150 milliliters over 1.0 gram of ruthenium polysulfide (5% Ru metal on charcoal). After reaction of five hours at 70° C. and 50–60 psig of hydrogen, the reaction was arbitrarily stopped. Analysis of product by gas liquid chromatography has shown that 56.5% of feed was converted to give the desired product 100%. The ratio of feed to Ru, gram/gram, was 42/1.

EXAMPLE 8

2 grams of 2-methyl-4-(3-aminophenyl)-3-butyn-2-ol were dissolved in 15 ml of toluene containing one pellet (0.1 grams) of sodium hydroxide which had been crushed to a powder. The mixture was charged to a 100 ml, round-bottom flask equipped with a Dean-Stark trap and condenser. The mixture was refluxed for one hour, and the accetone byproduct was removed periodically through the Dean-Stark trap. The reaction product was then cooled, and the mixture filtered to remove particles of caustic. After the solvent was stripped, a quantitative yield of 3-aminophenylacetylene (1.4 grams) of greater than 98% purity as analyzed by gas chromatography was obtained; refractive index, $n_D^{20}$, 1.686.

EXAMPLE 9

Two grams of 2-methyl-4-(3-nitrophenyl)-3-butyn-2-ol in 10 milliliters of isopropanol (16.8% conc.) was hydrogenated in the presence of 2.0 g. of wet $RuS_2$ paste (0.254 g. Ru) at 50° C., 50–60 psig of hydrogen, until theoretical amount of hydrogen was taken up. After filtration, and evaporation of the filtrate to dryness, a total of 1.63 grams of residue was obtained. Analysis by glc showed that 1.42 grams of desired amine was formed, corresponding to a yield of 83.5%. The remainder consisted of higher boiling, sulfur containing products. The conversion of feed was essentially 100%. This example shows that while high concentrations of feed can be tolerated, the use of too much catalyst per given amount of feed, 7.8 gram/gram of Ru in this example, resulted in considerable by-proudct formation, unless of course concentration is lowered as in Example 5.

Resort may be had to the variations and modifcations as fall within the spirit of the invention and the scope of the appended claims.

We claim:

1. A process for the production of an aromatic amino compound containing an hydroxy substituted acetylene group having at least three carbon atoms and where the acetylene group is directly connected to an aromatic ring carbon atom which comprises:
    contacting a charge stock comprising an aromatic nitro compound containing (i) at least one nitro group directly connected to an aromatic ring carbon atom and (ii) at least one acetylene group having at least three carbon atoms and an hydroxyl group on the carbon atoms adjacent to acetylene group, wherein the acetylene group is directly connected to an aromatic ring carbon atom, and wherein the aromatic portion of said aromatic nitro acetylene compound is selected from the group consisting of benzene, naphthalene, bibenzyl, diphenyl, diphenyl oxide, diphenyl sulfide and benzophenone, in the liquid phase with a solid catalyst consisting essentially of a ruthenium disulfide and in the added presence of free molecular hydrogen under hydrogenation conditions including a temperature from 20° C. to 120° C.

2. A process according to claim 1 wherein the reaction occurs in the added presence of an inert solvent.

3. A process according to claim 2 wherein the inert solvent is an organic oxygen containing compound.

4. A process in accordance with claim 2 wherein the organic solvent is selected from the group consisting of alcohols having from 1 to 5 carbon atoms, esters having from 3 to 6 carbon atoms; tetrahydrofuran; p-dioxane; organic acids having from 2 to 5 carbon atoms; and toluene.

5. A process in accordance with claim 4 wherein the aromatic nitro compound charge stock has a single aromatic ring.

6. A process in accordance with claim 5 wherein said aromatic nitro compound has the formula:

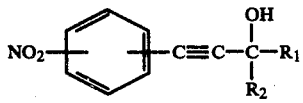

where $R_1$ and $R_2$ can be the same or different and are selected from the group consisting of hydrogen and lower alkyl groups having from 1 to 4 carbon atoms, phenyl, and substituted phenyl, and where $R_1$ and $R_2$ can form a saturated 5- or 6-membered ring.

7. A process in accordance with claim 6 wherein $R_1$ and $R_2$ are both methyl.

8. A process in accordance with claim 7 wherein the nitro compound is 2-methyl-4-(3-nitrophenyl)-3-butyn-2-ol.

9. A process in accordance with claim 1 wherein said ruthenium disulfide is distended on a support.

10. A process in accordance with claim 9 wherein the amount of ruthenium distended on said support is from 0.01 to 10 weight percent of the final catalyst.

11. A process in accordance with claim 10 wherein said catalyst support is selected from the group consisting of carbon, alumina, kieselguhr, silica, titanium dioxide, calcium carbonate, barium sulfate and bentonite.

12. A process in accordance with claim 11, which process is operated in the added presence of an organic solvent selected from the group consisting of alcohols having from 1 to 5 carbon atoms; esters having from 3 to 6 carbon atoms; tetrahydrofuran; p-dioxane; organic acids having from 2 to 5 carbon atoms; and toluene.

13. A process in accordance with claim 12 wherein the catalyst support is carbon.

14. A process in accordance with claim 13 wherein the aromatic nitro compound is 2-methyl-4-(3-nitrophenyl)-3-butyn-2-ol.

15. A process in accordance with claim 1 wherein said ruthenium disulfide catalyst is unsupported.

16. A process in accordance with claim 5, which process is operated in the added presence of an organic solvent selected from the group consisting of alcohols having from 1 to 5 carbon atoms; esters having from 3 to 6 carbon atoms; tetrahydrofuran; p-dioxane; organic acids having from 2 to 5 carbon atoms; and toluene.

17. A process in accordance with claim 1 wherein the resultant aromatic amino compound is converted to an amino aromatic acetylene by reacting said aromatic amino compound with an alkali metal hydroxide in the presence of an aromatic solvent.

18. A process in accordance with claim 17 wherein the $RuS_2$ is unsupported.

19. A process in accordance with claim 18 wherein the alkali metal hydroxide is sodium hydroxide.

20. A process in accordance with claim 19 wherein the aromatic solvent is toluene.

21. A process in accordance with claim 20 wherein said reaction is operated at reflux conditions.

22. A process for the preparation of an amino-phenylacetylene by the selective reduction of the nitro group in a nitrophenylacetylene having the formula:

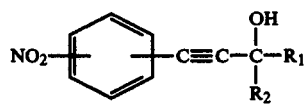

where $R_1$ and $R_2$ can be the same or different and are selected from the group consisting of hydrogen and lower alkyl groups having from 1 to 4 carbon atoms, phenyl, and substituted phenyl, and where $R_1$ and $R_2$ can form a saturated 5- or 6-membered ring which comprises:

(a) contacting said nitrophenylacetylene in the liquid phase in the presence of an inert organic solvent with a catalyst consisting essentially of ruthenium disulfide and in the added presence of free molecular hydrogen under hydrogenation conditions including a temperature from 25° C. to 80° C.;

(b) separating the resultant aminophyenl substituted acetylene from the reaction product;

(c) reacting said separated aminophenyl substituted acetylene with an alkali metal hydroxide in the presence of an aromatic solvent to produce aminophenylacetylene.

23. A process in accordance with claim 22 wherein the $RuS_2$ unsupported.

24. A process in accordance with claim 23 wherein the nitro group on the nitrophenylacetylene is in the meta position.

25. A process according to claim 1 wherein a sulfur species is additionally present during said contacting to maintain said ruthenium disulfide in the +4 valency state.

* * * * *